US011275043B2

(12) United States Patent
Prajapati et al.

(10) Patent No.: US 11,275,043 B2
(45) Date of Patent: Mar. 15, 2022

(54) NANO-SENSOR FOR DETECTING GASEOUS COMPONENTS

(71) Applicant: Indian Institute of Science, Bangalore (IN)

(72) Inventors: Chandra Shekhar Prajapati, Bangalore (IN); Navakanta Bhat, Bangalore (IN)

(73) Assignee: Indian Institute of Science, Bangalore (IN)

( * ) Notice: Subject to any disclaimer, the term of this patent is extended or adjusted under 35 U.S.C. 154(b) by 0 days.

(21) Appl. No.: 16/755,344

(22) PCT Filed: Oct. 10, 2018

(86) PCT No.: PCT/IN2018/050646
§ 371 (c)(1),
(2) Date: Apr. 10, 2020

(87) PCT Pub. No.: WO2019/073483
PCT Pub. Date: Apr. 18, 2019

(65) Prior Publication Data
US 2021/0199612 A1    Jul. 1, 2021

(30) Foreign Application Priority Data

Oct. 10, 2017 (IN) .............................. 201741036034

(51) Int. Cl.
*G01N 27/18* (2006.01)
(52) U.S. Cl.
CPC .................................. *G01N 27/18* (2013.01)
(58) Field of Classification Search
CPC ........................................................ G01N 27/18

(Continued)

(56) References Cited

U.S. PATENT DOCUMENTS 5,356,756 A * 10/1994 Cavicchi ................ G01N 27/18
204/192.12
2015/0241383 A1    8/2015 Blackburn et al.
(Continued)

FOREIGN PATENT DOCUMENTS

WO    WO-2016166126 A1 * 10/2016 ............. G01N 27/27
WO    WO-2016166126 A1    10/2016
WO    WO-2019073483 A1     4/2019

OTHER PUBLICATIONS

"International Application No. PCT/IN2018/050646, International Search Report and Written Opinion dated Nov. 1, 2019", (dated Nov. 1, 2019), 10 pgs.

*Primary Examiner* — Christopher P McAndrew
(74) *Attorney, Agent, or Firm* — Schwegman Lundberg & Woessner, P.A.

(57) ABSTRACT

Nano-sensors, nano-sensor array and methods of fabrication thereof are provided. A nano-sensor comprises a pair of sensing electrode assemblies aligned longitudinally along a first axis. Each sensing electrode assembly comprises an electrode strip coupled to a contact pad at a first end of the electrode strip. A sensing member is disposed between the pair of sensing electrode assemblies to detect, at a predetermined temperature, presence of a gaseous component. A thermally conductive layer is provided in contact with the sensing member. The nano-sensor comprises a heating assembly, comprising a heating strip disposed between and coupled to a pair of heating contact pads, aligned longitudinally along a second axis substantially perpendicular to the first axis. A portion of the heating strip is in contact with the thermally conductive layer to heat the sensing member through the thermally conductive layer.

13 Claims, 9 Drawing Sheets

(58) Field of Classification Search
USPC .......................................................... 324/693
See application file for complete search history.

(56) References Cited

U.S. PATENT DOCUMENTS

2016/0320334 A1    11/2016  Nakatou et al.
2018/0156747 A1*   6/2018   Le Neel ................. G01N 27/18

* cited by examiner

NANO-SENSOR FOR DETECTING GASEOUS COMPONENTS

PRIORITY CLAIM TO RELATED APPLICATIONS

This application is a U.S. national stage filing under 35 U.S.C. § 371 from International Application No. PCT/IN2018/050646, filed on 10 Oct. 2018, and published as WO2019/073483 on 18 Apr. 2019, which claims the benefit under 35 U.S.C. 119 to India Application No. 201741036034, filed on 10 Oct. 2017, the benefit of priority of each of which is claimed herein, and which applications and publication are hereby incorporated herein by reference in their entirety.

TECHNICAL FIELD

The present disclosure generally relates to chemical sensors, and in particular, to nano-sensors and to fabrication methods thereof.

BACKGROUND

Chemical sensors are devices used to identify components of gaseous mixtures, for example, toxic and harmful gases. Chemical sensors may be, for example, combustible gas sensors, photoionization detectors, infrared point sensors, ultrasonic sensors, electrochemical gas sensors, solid-state sensors, and the like.

Generally, solid-state sensors detect gases by a chemical reaction that takes place when the gases come in direct contact with the sensor's chemically active component. Metal oxides, such as tin dioxide, are generally used in solid-state sensors as active components. An electrical parameter, for example, the electrical resistance of metal oxide in the sensor changes when it comes in contact with the monitored gas which can be measured to detect the gas being tested.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
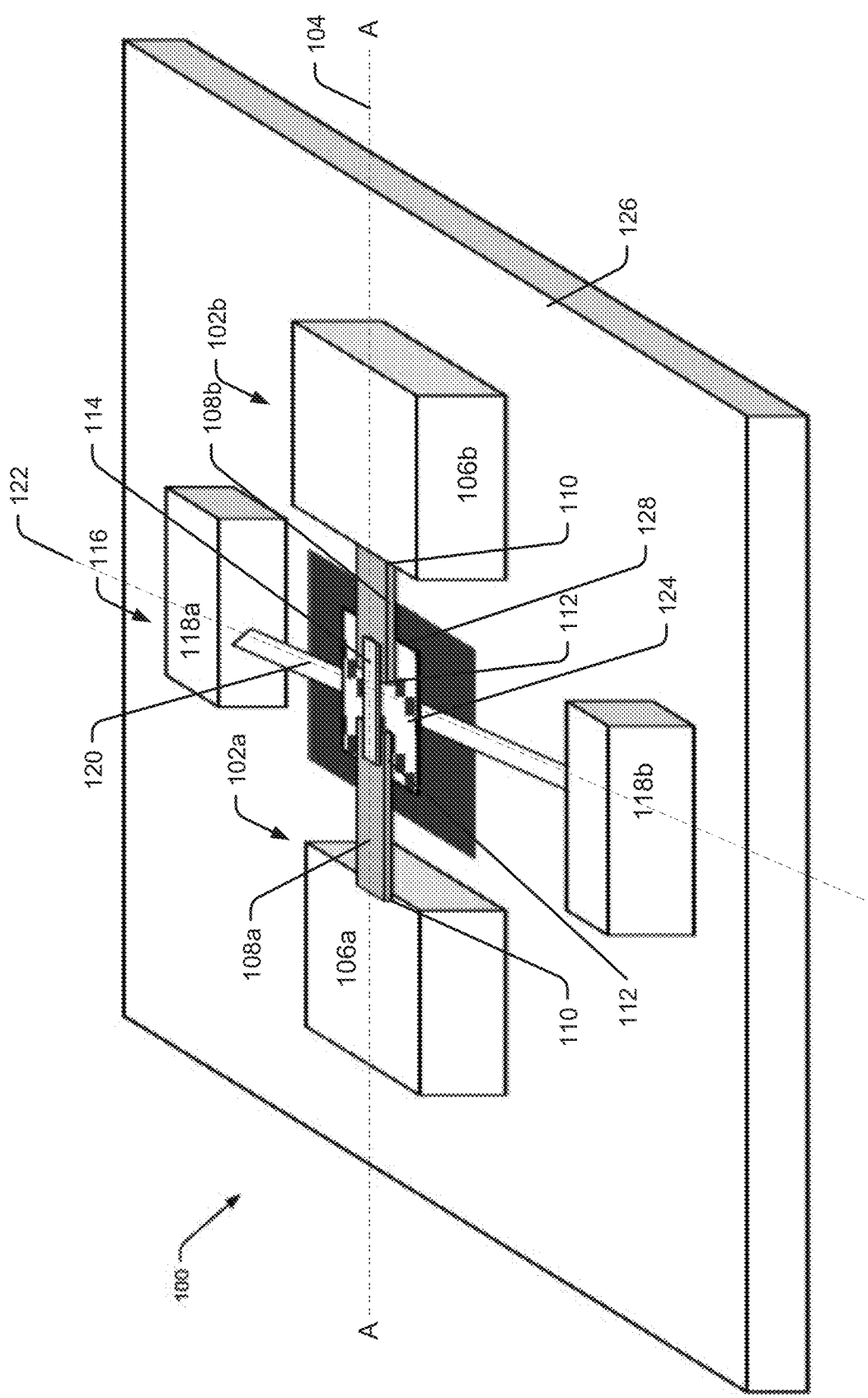
FIG. 1 illustrates a perspective view of a nano-sensor of the present subject matter, in accordance with an implementation of the present disclosure.

The present subject matter provides a nano-sensor and a method of fabricating the nano-sensor. Further, the present subject matter provides an array comprising at least two nano-sensors and a method of fabricating thereof.

Chemical sensors are devices used to identify components of gaseous mixtures, such as, toxic and harmful gases. In some cases, the amount/composition of the components in the gaseous mixtures may also be determined by the chemical sensors. Solid-state sensors detect gases by a chemical reaction that takes place when the gases come in contact with an active material provided as part of the chemical sensor. For example, metal oxide, such as, tin dioxide can be used as active material in chemical sensors.

Generally, initially, the chemical sensor is exposed to clean air so that oxygen present in the clean air is adsorbed on the metal oxide surface. The high electron affinity of adsorbed oxygen attracts free electrons inside the metal oxide, forming a potential barrier at the grain boundaries. This potential barrier prevents electron flow, causing high sensor resistance in clean air. When the chemical sensor is subsequently exposed to the gas to be detected, such as carbon monoxide, oxidation reaction of such gas with the adsorbed oxygen occurs at the surface of metal oxide. This results in change in resistance of metal oxide of the chemical sensor. The change in resistance can be used to detect the presence and concentration of the gas to be detected.

Chemical sensors are assessed for their gas detection performance based on certain performance characteristics, such as, sensitivity, selectivity, limit of detection, response time, recovery time, sensor stability, and the like. In general, miniaturized solid-state sensors, such as micro-sensors provide small-form factor, low cost, and good compatibility with Micro Electro Mechanical Systems (MEMS). These micro-sensors, generally, require high temperature of operation corresponding to chemical reaction activation energy.

The performance characteristics of micro-sensors can be improved by changing an operating temperature of the micro-sensor. Therefore, conventionally available micro-sensors are provided with a heater of micron-scale to manage the operating temperature of the micro-sensor. However, the micro-sensors consume high power due to the presence of the microheaters. Generally, a size of the microheater varies in the range of tens to hundreds of microns.

To reduce power consumption, techniques, such as surface and bulk micromachining processes have been used to release heater active areas, i.e., areas below the heaters. In general, surface micromachined sensors have been found to be more compatible with monolithic complementary metal-oxide-semiconductor (CMOS) than bulk micromachined sensors. However, surface micromachined sensors result in fragile structures which makes packaging of the sensors cumbersome. Additionally, surface micromachining process utilizes wet chemicals for isotropic etching which is further associated with process reliability, for example, surface micromachining process with wet chemical etch process is associated with low yield The present subject matter provides a solid-state nano-sensor and its fabrication method. Nano-sensors, as will be understood, are chemical sensors which have at least one dimension in the scale of nanometers. The present disclosure also provides an array comprising the nano-sensor, the array having a cross-bar architecture and consuming less than 2 milliwatts of power at an operating temperature of 300° C. Further, the nano-sensor has a high selectivity to detect sub-ppm ranges of gaseous components. The nano-sensor of the present subject matter provides a low limit of detection (LOD), and a fast response and recovery time.

In one example, the nano-sensor of the present subject matter comprises a pair of sensing electrode assemblies aligned longitudinally along a first axis. Each sensing electrode assembly can comprise a contact pad and an electrode strip coupled to the contact pad at a first end of the electrode strip. A sensing member is aligned longitudinally along the first axis and disposed between the pair of sensing electrode assemblies. The sensing member is in contact with a top portion of a second end of the electrode strip of each sensing electrode assembly of the pair of sensing electrode assemblies. The sensing member is to detect, at a predetermined temperature, presence of a gaseous component in an ambient gas.

A thermally conductive layer can be provided in contact with the sensing member. In an example, the thermally conductive layer is an electrically insulated layer. The nano-sensor also comprises a heating assembly comprising a pair of heating contact pads and a heating strip disposed between and coupled to the pair of heating contact pads. The heating assembly is aligned longitudinally along a second axis substantially perpendicular to the first axis, thereby, providing a cross-bar architecture. A portion of the heating strip can be in contact with the thermally conductive layer to heat the sensing member to the predetermined temperature through the thermally conductive layer.

The cross-bar architecture, i.e., the heating assembly being aligned perpendicular to the pair of sensing electrodes, reduces power consumption of the nano-sensor and helps in operating the nano-sensor at a high temperature of 400-500 degrees C. In an example, to heat the sensing member effectively and reduce heat losses, an air pocket can be provide in a sacrificial layer below the portion in contact with the thermally conductive layer. In said example, the air pocket creates a thermal insulation below the heating strip and reduces heat losses and ensures effective heating of the sensing member through the thermally conductive layer.

The present subject matter also provides a nano-sensor array comprising a plurality of the nano-sensors. Each of the plurality of nano-sensors may be fabricated on a common semi-conductor die comprising a substrate and a sacrificial layer provided thereon. Each of the plurality of nano-sensors may be used to detect presence of a specific gaseous component in an ambient gas. For example, a first nano-sensor may be used to detect carbon monoxide and a second nano-sensor may be used to detect carbon dioxide and so on. Therefore, the nano-sensor array provides for multiplexed detection of gaseous components in an ambient gas.

Methods for fabricating the nano-sensor and the nano-sensor array of the present subject matter are also provided. To fabricate the nano-sensor, the sacrificial layer can be deposited over the substrate. The heating assembly is patterned and formed on the sacrificial layer. The thermally conductive layer is then deposited on the heating strip of the heating assembly. The pair of sensing electrode assemblies are patterned and formed. The sensing member is then deposited between the pair of the sensing electrodes. The sacrificial layer below the heating strip can be removed to form the air pocket below the heating strip. A similar method is provided for the fabrication of nano-sensor arrays.

The methods use a top-down processing technique to fabricate the nano-sensor and the nano-sensor array. In one example, the methods use a reactive ion etching process for surface micromachining of the various components of the nano-sensor and the nano-sensor array as opposed to conventional wet chemical etching, thereby, reducing complexity of fabrication and improving reliability of the nano-sensor and nano-sensor array fabricated using the method.

The above and other features, aspects, and advantages of the subject matter will be better explained with regard to the following description and accompanying figures. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

FIG. 1 depicts an example nano-sensor 100, in accordance with an implementation of the present subject matter. The nano-sensor 100 may comprise a pair of sensing electrode assemblies 102a, 102b, hereinafter also referred to as sensing electrode assemblies 102. The pair of sensing electrode assemblies 102a, 102b may be aligned longitudinally along a first axis 104.

Each sensing electrode assembly of the pair of sensing electrode assemblies 102 can comprise a contact pad and an electrode strip. For example, electrode assembly 102a can have a contact pad 106a and an electrode strip 108a and electrode assembly 102b can have a contact pad 106b and an electrode strip 108b. The contact pads 106a and 106b are hereinafter referred to as contact pad 106 and the electrode strips 108a and 108b are hereinafter referred to as electrode strip 108.

Each electrode strip 108 can comprise a first end 110 and a second end 112. The first end 110 of each electrode strip 108 can be coupled to respective contact pad 106. The second end 112 of each electrode strip 108 may be separated by a length of 150-250 nm. In an example, the second end 112 is separated by a length of 200 nm. The length between the second end 112, also referred to as nano-gap, helps in better contact of a sensing member 114 with a heating assembly 116. The electrode strip 108 and the contact pad 106 may be fabricated from metals, such as platinum titanium, and the like. In one example, thickness of the electrode strip 108 is in a range of 10 nm to 100 nm.

The nano-sensor 100 further includes the sensing member 114. The sensing member 114 can be aligned longitudinally along the first axis 104 and disposed between the pair of sensing electrode assemblies. The sensing member 114 can be in contact with a top portion of the second end 112 of each electrode strip 108. The sensing member 114 can be used to detect, at a predetermined temperature, presence of a gaseous component in an ambient gas.

The sensing member 114 can be fabricated from material, such as zinc oxide, barium titanium oxide, copper oxide with silver doping, tungsten oxide, and vanadium oxide, or any metal oxide thereof. In one example, the sensing member 114 has a thickness in a range of 10 nm to 200 nm. As will be understood, based on the material used for fabricating of the sensing member 114, different gaseous components can be detected. Further, the predetermined temperature can depend on the material and the gaseous component being detected.

To heat the sensing member 114 to the predetermined temperature, the nano-sensor 100 can comprise the heating assembly 116. The heating assembly 116 can comprise a pair of heating contact pads 118*a* and 118*b* and a heating strip 120. The heating strip 120 can be disposed between and coupled to the pair of heating contact pads 118*a* and 118*b*.

The heating assembly 116 can be aligned longitudinally along a second axis 122. The second axis 122 is substantially perpendicular to the first axis 104. The heating assembly 116 is, therefore, perpendicular to the pair of sensing electrode assemblies 102. This arrangement is referred to as cross-bar architecture. The cross-bar architecture helps in reducing power losses, heat losses, and, thereby, improving heating efficiency of the sensing member 116.

In one example, the heating assembly 116 comprising the heating strip 120 and the pair of heating contact pads 118*a* and 118*b* is fabricated from metals, such as platinum, titanium, titanium nitride, and the like. In an example, a thickness of the heating strip is 10 nm to 100 nm. As will be understood, the heating strip 120 and the pair of heating contact pads 118*a* and 118*b* can be fabricated from different materials.

To further improve transfer of heat from the heating assembly 116 to the sensing member 114, a thermally conductive layer 124 can be provided in contact with the sensing member 114 and the heating strip 120. A portion of the heating strip 120 can be in contact with the thermally conductive layer 124 to heat the sensing member 114 through the thermally conductive layer 124. In one example, the thermally conductive layer 124 is provided substantially at a center of the heating strip 120. In said example, the sensing member 124 is also provided substantially above the center of the heating strip 120. As will be understood, maximum heat is generated at the center of the heating strip 120. By having the cross-bar architecture as described previously, all the heat from the heating strip 102 can be transferred to the sensing member 114 through the thermally conductive layer 124, thereby, reducing heat losses and reducing power consumption.

In an example, the thermally conductive layer 124 is fabricated from an electrically insulating material. This reduces power consumption while ensuring adequate heating of the sensing member 114. In an example, the thermally conductive layer 124 is fabricated from a semiconductor material such as silicon oxide, silicon nitride and the like. In an example, a thickness of the thermally conductive layer 124 is in a range of 10 nm to 200 nm.

In one example, the nano-sensor 100 can be formed on a sacrificial layer 126 which may be formed on a substrate (not shown). The substrate can be, for example, a semiconductor die and the sacrificial layer 126 may be, for example silicon dioxide. In said example, an air pocket 128 can be provided below the portion of the heating strip 120 in contact with the thermally conductive layer 124. The air pocket 128 creates an insulated environment below the heating strip 120, thereby, ensuring unidirectional transfer of heat to the sensing member 114 and reducing heat loss that may otherwise occur by conduction to the sacrificial layer below the heating strip 120. The air pocket 128 can be provided by removing the sacrificial layer 126 below the heating strip 120.

Since the thermally conductive layer 124 and the electrode strip 108 are formed on the heating strip 120, the electrode strip 108 and thermally conductive layer 124 may also be suspended over the air pocket, as will be understood. The electrode strip 108 may be partially suspended and partially in contact with the sacrificial layer 126 where it is not suspended over the air pocket 128. However, the contact pad 106 and the pair of heating contact pads 118*a* and 118*b* may be provided on the sacrificial layer 126 to support the electrode strip 108 and the heating strip 120, respectively.

Figure 2:
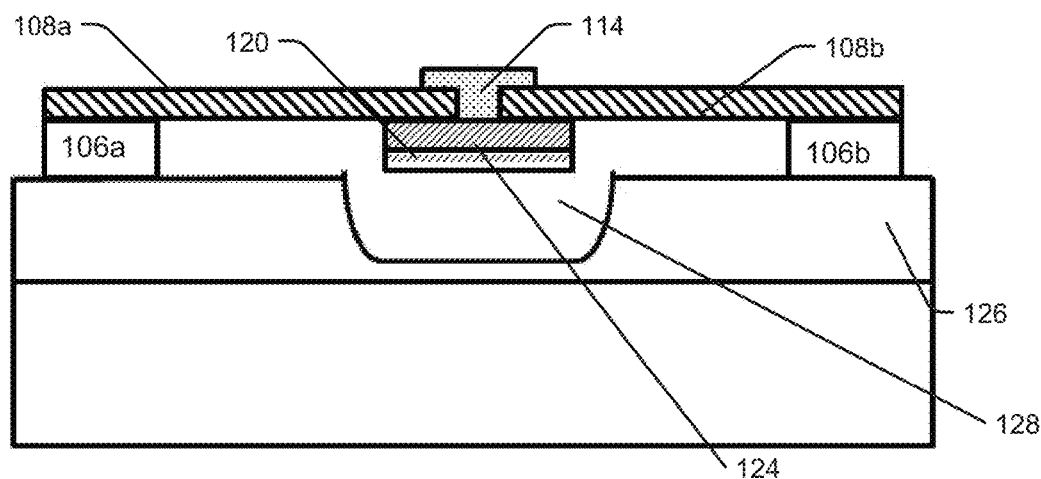
FIG. 2 illustrates a cross-sectional view of the nano-sensor of the present subject matter, in accordance with an implementation of the present disclosure.

FIG. 2 depicts a cross-sectional view of the nano-sensor 100 as taken along a line A-A parallel to the first axis 104, in accordance with an implementation of the present subject matter. As can be seen from FIG. 2, the nano-sensor 100 comprises the air pocket 128 formed in the sacrificial layer 126 below the heating strip 120. In one example, a width of the heating strip 120 is less than a width of the thermally conductive layer 124 as shown in FIG. 1. In another example, as shown in FIG. 2, the width of the heating strip 120 is substantially equal to the width of the thermally conductive layer 124.

In one example, as shown in FIG. 2, the sensing member 114 can have a T-shaped cross-section with flanges, i.e., horizontal components, being in contact with the second end 112 of the electrode strip 108 and stem, i.e., vertical component, being in contact with the thermally conductive layer 124 to receive heat from the heating strip 120. However, other configurations of the sensing member 114 are possible as will be understood.

In operation, with respect to FIGS. 1 and 2, when a first voltage is applied to the pair of heating contact pads 118*a* and 118*b*, the heating strip 120 heats up. The heat is then transferred through the thermally conductive layer 124 to the sensing member 114. A second voltage may then be applied to the contact pads 106*a* and 106*b*. When the predetermined temperature is reached at the sensing member 114, it reacts with the gaseous component in the ambient gas that the nano-sensor 100 is exposed to. Reaction of the gaseous component with the material of the sensing member 114 causes a change in electrical resistance. The change in electrical resistance can be measured and used to detect and measure concentration of the gaseous component. While a single nano-sensor 100 can be used for detection of a single gaseous component, multiple nano-sensors can be provided on a single die to detect multiple gaseous components at the same time.

Figure 3:
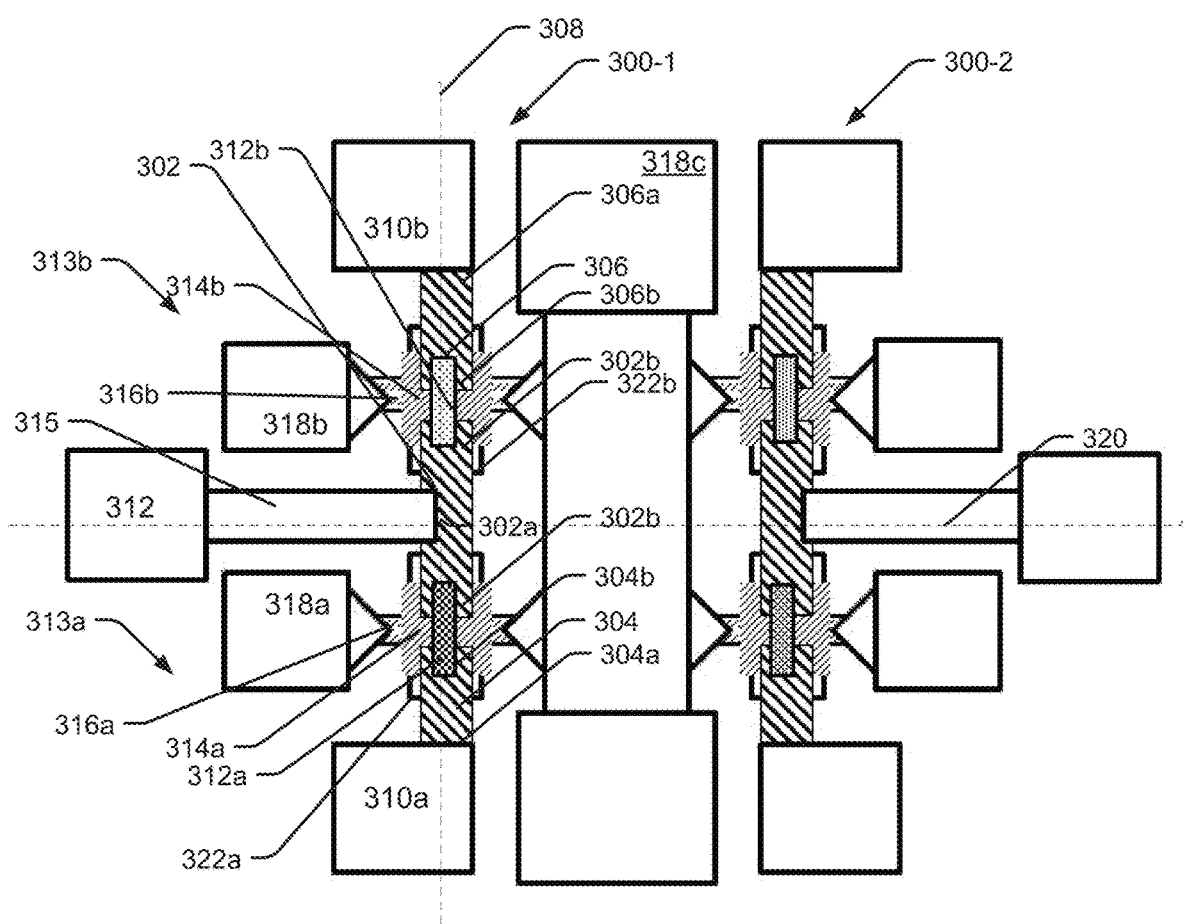
FIG. 3 illustrates a top-view of a nano-sensor array of the present subject matter, in accordance with an implementation of the present subject matter.

FIG. 3 depicts a top-view of an arrangement comprising two nano-sensor arrays 300-1, 300-2, hereinafter referred to as nano-sensor array 300, in accordance with an implementation of the present subject matter. An array, as will be understood, is an ordered arrangement of components. While the nano-sensor array 300 depicts two nano-sensors, it is to be understood, the nano-sensor array 300 can have any number of nano-sensors depending on application.

In one example, the nano-sensors 100 are components of the nano-sensor array 300. In another example, to obtain optimization in performance and arrangement, the nano-sensor 100 may be modified as explained with reference to FIG. 3. FIG. 3 has been explained with reference to nano-sensor array 300-1, hereinafter referred to as nano-sensor array 300, for sake of brevity.

The nano-sensor array 300 can comprise a sensing electrode assembly. The sensing electrode assembly can comprise a common electrode strip 302. The common electrode strip 302 can have an intermediate portion 302*a* provided between two opposing ends 302*b* of the common electrode strip 302. The sensing electrode assembly further comprises a first electrode strip 304 and a second electrode strip 306. The first electrode strip 304, the second electrode strip 306 and the common electrode strip 302 can be aligned longitudinally along a first axis 308. The common electrode strip 302 can be provided between the first electrode strip 304 and the second electrode strip 306.

The sensing electrode assembly can comprise a respective contact pad at a first end of the first electrode strip 304 and the second electrode strip 306, for example, a contact pad can be coupled to a first end of the first electrode strip 304 and another contact pad coupled to a first end of the second electrode strip 306. For example, a first end 304*a* of the first electrode strip 304 can be coupled to a contact pad 310*a* and a first end 306*a* of the second electrode strip 306 can be coupled to a contact pad 310*b*.

To optimize arrangement of the nano-sensor array 300, a common contact pad 312 may be coupled to the intermediate portion of the common electrode strip 302. The common contact pad 312 can be coupled to the common electrode strip using a common contact strip 315. In one example, the common contact pad 312 and the common contact strip 315 are longitudinally aligned along an axis perpendicular to the axis 308. Therefore, the common contact pad 312, an opposing end 302*b* of the common electrode strip 302, the first electrode strip 304 and contact pad 310*a* behave similar to the pair of sensing electrode assemblies 102 of the nano-sensor 100 as shown in FIGS. 1 and 2. Similarly, the common contact pad 312, another opposing end 302*b* of the common electrode strip 302, the second electrode strip 306 and contact pad 310*b* behave similar to the pair of sensing electrode assemblies 102 of the nano-sensor 100 as shown in FIGS. 1 and 2. Thus, two pairs of sensing electrode assemblies may be formed using three contact pads and three electrode strips.

In one example, the first electrode strip 304, the second electrode strip 306, the common electrode strip 302 may be fabricated from metal such as platinum, titanium, titanium nitride, and the like.

The nano-sensor array 300 further comprises a first sensing member 312*a* and a second sensor member 312*b* which may be similar to the sensing member 114 as shown in FIGS. 1 and 2.

The first sensing member 312*a* may be aligned longitudinally along the first axis 308. The first sensing member 312*a* may be disposed between the first electrode strip 304 and the common electrode strip 302. In an example, the first sensing member 312*a* can be disposed between the first electrode strip 304 and the opposing end 302*b*. The first sensing member 312*a* can be in contact with a second end 304*b* of the first electrode strip 304 and the common electrode strip 302. The first sensing member 312*a* can be used to detect, at a first predetermined temperature, presence of a first gaseous component in an ambient gas. In one example, similar to the sensing member 114, the first sensing member 312*a* can be fabricated from material, such as zinc oxide, barium titanium oxide copper oxide with silver doping, tungsten oxide, and vanadium oxide. The first sensing member 312*a* can have a thickness in a range of 10 nm to 200 nm.

The second sensing member 312*b* may be aligned longitudinally along the first axis 308. The second sensing member 312*b* may be disposed between the second electrode strip 306 and the common electrode strip 302. In an example, the second sensing member 312*b* can be disposed between the second electrode strip 306 and the opposing end 302*b*. The second sensing member 312*b* can be in contact with a second end 306*b* of the second electrode strip 306 and the common electrode strip 302. The second sensing member 312*b* can be used to detect, at a second predetermined temperature, presence of a second gaseous component in the ambient gas. In one example, similar to the sensing member 114, the second sensing member 312*b* can be fabricated from material, such as zinc oxide, barium titanium oxide copper oxide with silver doping, tungsten oxide, and vanadium oxide. The second sensing member 312*b* can have a thickness in a range of 10 nm to 200 nm. As will be understood, the first sensing member 312*a* and the second sensing member 312*b* can be fabricated from different materials depending on the gaseous components being detected.

A respective thermally conductive layer 314 may be in contact with each one of the first sensing member 312*a* and the second sensing member 312*b*. In an example, a first thermally conductive layer 314*a* is provided in contact with the first sensing member 312*a* and the second thermally conductive layer 314*b* is provided in contact with the second sensing member 312*b*.

The nano-sensor array 300 can further comprise a heating assembly. The heating assembly can comprise a first heating assembly 313*a* and a second heating assembly 313*b*. Each of the first heating assembly 313*a* and the second heating assembly 313*b* may be similar to the heating assembly 116 as shown in FIGS. 1 and 2.

The first heating assembly 313*a* may be in contact with the first thermally conductive layer 314*a* and the second heating assembly 313*b* may be in contact with the second thermally conductive layer 314*b*. Similar to the heating assembly 116, each of the first heating assembly 313*a* and the second heating assembly 313*b* can include a heating strip. For example, the first heating assembly 313*a* can have a heating strip 316*a* and the second heating assembly 313*b* can have a heating strip 316*b*. Heating strips 316*a* and 316*b* are hereinafter referred to as heating strips 316. A portion of the heating strip 316 is in contact with the respective thermally conductive layer, namely, the first thermally conductive layer 314*a* and the second conductive layer 314*b*, to heat the first sensing member 312*a* and the second sensing member 312*b* to the predetermined temperature through the thermally conductive layer.

Further, each of the first heating assembly 313*a* and the second heating assembly 313*b* can include a pair of heating contact pads provided at either end of the heating strips 316. In one example, one each of the pair of heating contact pads may be common between the first heating assembly 313*a* and the second heating assembly 313*b*. For example, heating contact pad 318*c* may be referred to as a common heating pad 318*c* of the first heating assembly 313*a* and the second heating assembly 313*b*. The common heating pad 318*c* may be used for optimizing space usage on the die and also for providing a common ground voltage for the first heating assembly 313*a* and the second heating assembly 313*b* which helps in further reducing power consumption of the nano-sensor array 300.

The heating contact pad 318*a* and heating contact pad 318*b* may be coupled to the heating strip 316 of the first heating assembly 313*a* and the second heating assembly 313*b*, respectively, opposite to end coupled to the common heating pad 318*c*. The heating contact pad 318*a* and heating contact pad 318*b* may be used to provide different voltages to the first heating assembly 313*a* and the second heating assembly 313*b* to heat the sensing member 312*a* and the sensing member 312*b* to different predetermined temperatures for detecting different gaseous components.

The heating assembly comprising the first heating assembly 313*a* and the second heating assembly 313*b* can be aligned such that the heating strip 316*a* and heating strip 316b are aligned longitudinally along a second axis 320. The second axis 320 is substantially perpendicular to the first axis 308. Therefore, the nano-sensor array 300 also includes a cross-bar architecture similar to the nano-sensor 100.

Similar to the nano-sensor 100 as shown in FIGS. 1 and 2, the nano-sensor array 300 can include a first air pocket 322a provided beneath the heating strip 316 of the first heating assembly 313a and a second air pocket 322b provided beneath the heating strip of 316 of the second heating assembly 313b.

In operation, the common heating pad 318c is grounded and each of the heating contact pads 318a and 318b are electrically connected to the common heating pad 318c. Voltage can be supplied to the heating contact pads 318a and 318b to heat the heating strip 316 of the first heating assembly 313a and second heating assembly 313b. As will be understood, different voltages may be supplied to the heating contact pads 318a and 318b to heat the heating strips 316 to different temperatures based on the gaseous component to be detected and the first sensing member 312a and the second sensing member 312b. Heat from the heating strip 316 is transferred to the first sensing member 312a and the second sensing member 312b.

On heating of the first sensing member 312a and the second sensing member 312b to their corresponding predetermined temperature, the material of the first sensing member 312a and the second sensing member 312b react with respective gaseous components to be detected. A voltage may be provided between each of the first electrode strip 304 and the common electrode strip 302; and the second electrode strip 306 and the common electrode strip 302. Reaction of the first sensing member 312a and the second sensing member 312b causes a change in resistance between the respective electrode strips. The change in resistance can be used to detect the respective gaseous components. The change in resistance can be measured using methods known in the art and are not described for brevity.

The present subject matter, therefore, provides nano-sensors and the nano-sensor array which can be used for detection of gases. Although the nano-sensors and the nano-sensor array comprise heating assemblies, the power consumption is low.

Figure 4:
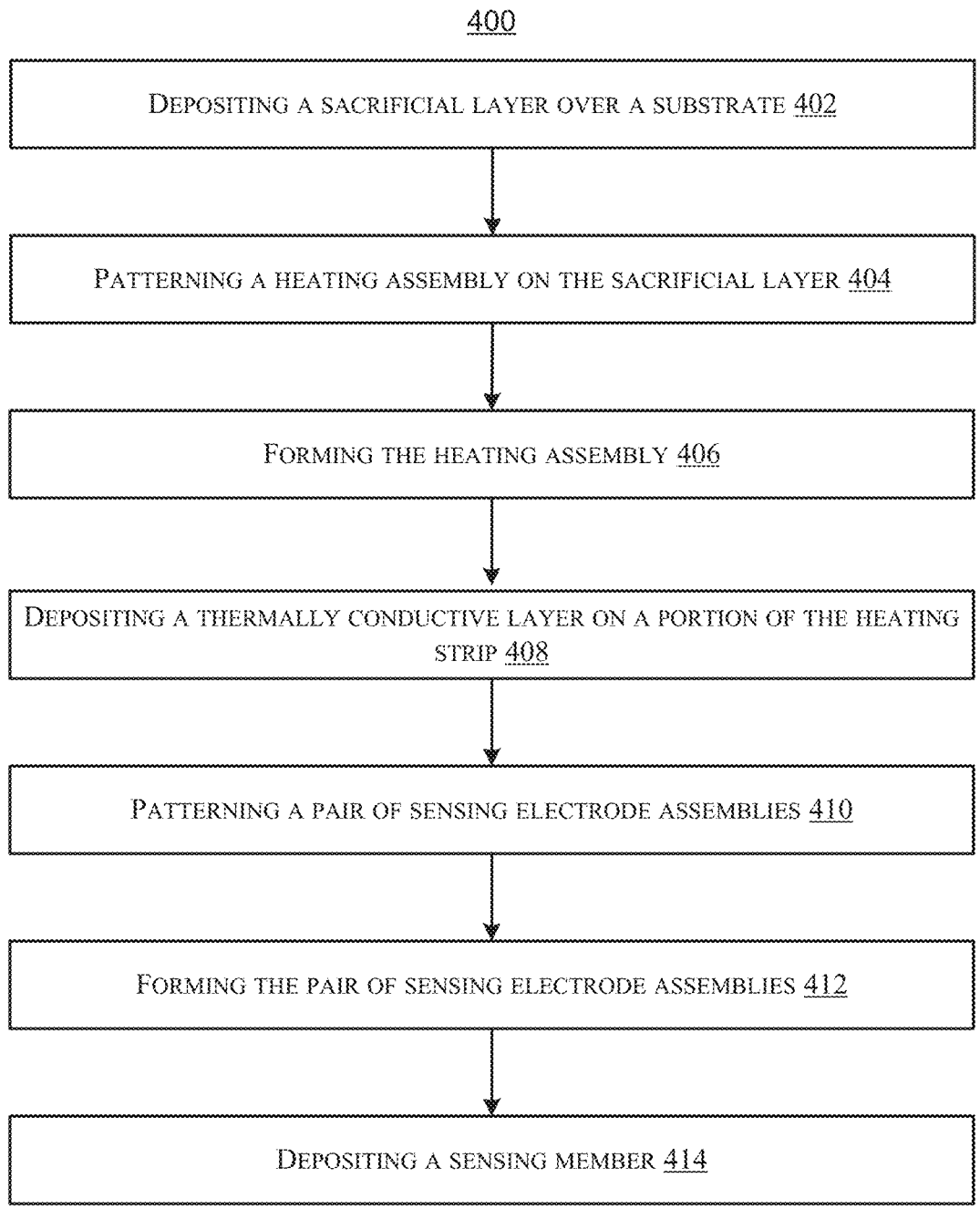
FIG. 4 illustrates a method for fabricating the nano-sensor of the present subject matter, in accordance with an implementation of the present subject matter.
Figure 5:
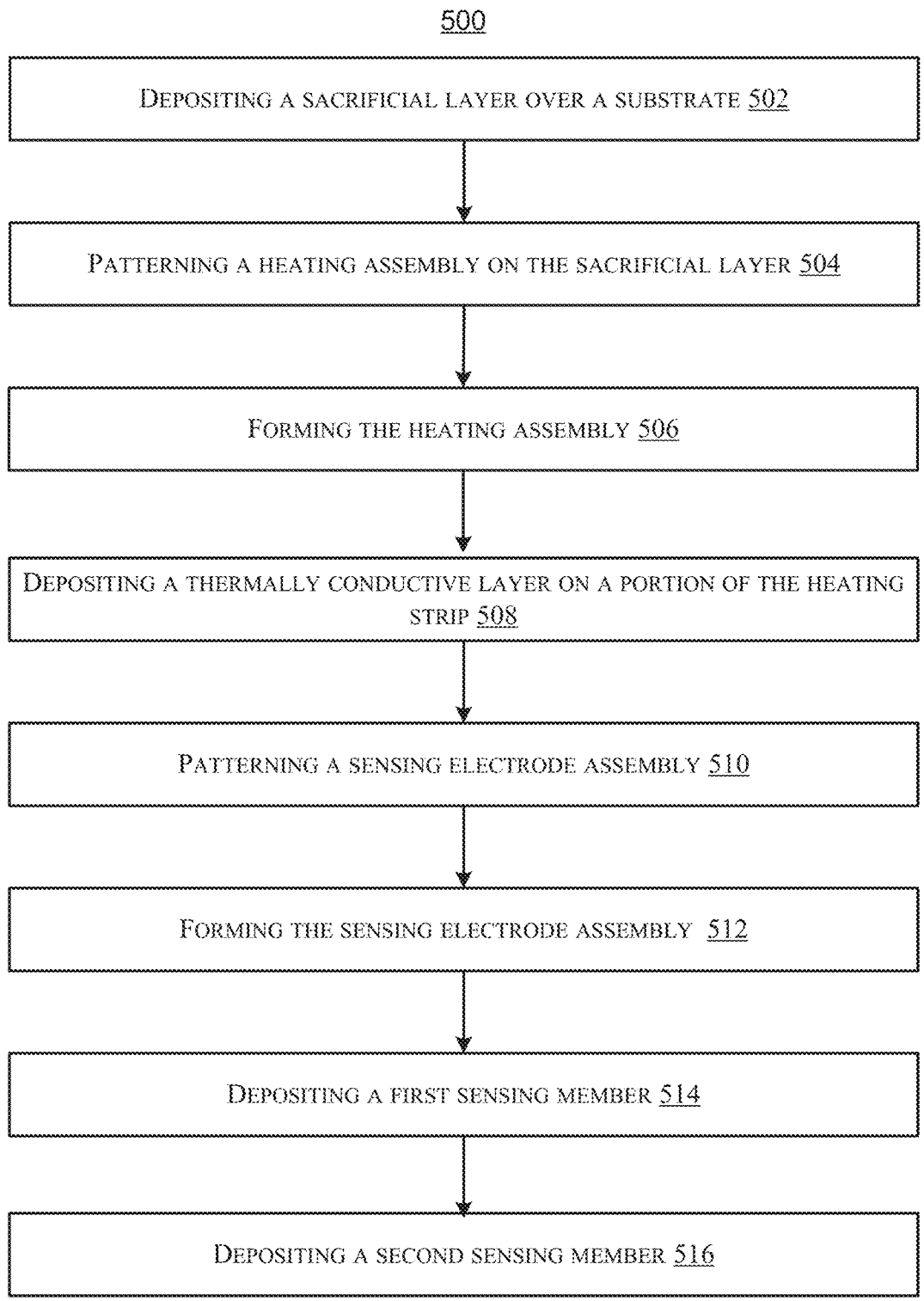
FIG. 5 illustrates a method for fabricating the nano-sensor array of the present subject matter, in accordance with an implementation of the present subject matter.

The present subject matter further provides method for fabricating the nano-sensor and the nano-sensor array. FIG. 4 illustrates an example method 400 for fabricating a nano-sensor, in accordance with principles of the present subject matter. FIG. 5 illustrates an example method 500 for fabricating a nano-sensor array, in accordance with an implementation of the present subject matter.

The order in which the methods 400 and 500 are described is not intended to be construed as a limitation, and any number of the described method blocks can be combined in any order to implement the methods or an alternative method. Additionally, individual blocks may be deleted from the methods 400 and 500 without departing from the scope of the subject matter described herein.

With reference to FIG. 4, the method 400, at block 402, comprises depositing a sacrificial layer over a substrate. In one example, the depositing is by using thermal dry oxidation. However, other techniques such a Chemical Vapor Deposition (CVD) and variation thereof may also be used. In one example, the substrate is silicon and the sacrificial layer is silicon dioxide.

At block 404, a heating assembly can be patterned on the sacrificial layer. In an example, the heating assembly may be heating assembly 116 as shown in FIG. 1 and FIG. 2. At block 406, the heating assembly can be formed based on pattern formed at block 404. In one example, for patterning Electron Beam Lithography (EBL) using polymethylmethacrylate (PMMA) as an electron sensitive resist is used. The heating assembly can be formed at block 406 using Direct Current Sputtering (DC-sputtering) of metal followed by lift-off to remove the resist.

At block 408, a thermally conductive layer is deposited on a portion of the heating strip. In one example, the thermally conductive layer may be thermally conductive layer 124 as shown in FIG. 1. In one example, the thermally conductive layer is silicon dioxide which is deposited over the portion of the heating strip by Electron Beam Evaporation (e-beam evaporation) as known in the art. However, as will be understood, other techniques may be used.

At block 410, a pair of sensing electrode assemblies can be patterned. In an example, the pair of sensing electrode assemblies are patterned over the sacrificial layer and the thermally conductive layer. In an example, the pair of sensing electrode assemblies may be the sensing electrode assembles 102a and 102b as shown in FIG. 1. In one example, the pair of sensing electrode assemblies can be patterned using Electron Beam Lithography (EBL) using polymethylmethacrylate (PMMA) as an electron sensitive resist.

At block 412, the pair of sensing electrode assemblies may be formed based on the pattern as formed at block 410. In an example, the pair of sensing electrode assemblies can be formed by DC-sputtering of the metal, for example, platinum or titanium nitride and the like.

At block 414, a sensing member can be deposited on the pair of sensing electrode assemblies. In an example, the sensing member may be the sensing member 114 as shown in FIG. 1 and FIG. 2. In one example, this can be deposited using Radio Frequency sputtering. However other deposition techniques, such as Direct Current sputtering, solution dispensing can also be used.

In one example, the method 400 can further comprise creating an air pocket in the sacrificial layer below the portion of the heating strip in contact with the thermally conductive layer. In one example, the air pocket created may be air pocket 128 as described in FIG. 1 and FIG. 2. The air pocket may be created by etching and lithography techniques known in the art. In an example, the method 400 can use reactive ion etching (RIE) for surface micro-machining as opposed to conventional wet chemical etching, thereby, increasing the integrity and strength of the nano-sensor so obtained.

FIG. 5 depicts the example method 500 for fabricating a nano-sensor array, in accordance with an implementation of the present subject matter. In an example, the nano-sensor array may be nano-sensor array 300 as described with reference to FIG. 3.

With reference to FIG. 5, the method 500, at block 502, comprises depositing a sacrificial layer over a substrate. In one example, the depositing is by using thermal dry oxidation. However, other techniques such a Chemical Vapor Deposition (CVD) may also be used. In one example, the substrate is silicon and the sacrificial layer is silicon dioxide.

At block 504, a heating assembly can be patterned on the sacrificial layer. In an example, the heating assembly may be heating assembly comprising a first heating assembly 313a and a second heating assembly 313b comprising heating strip 316 as described with reference to FIG. 3. At block 506, the heating assembly can be formed based on pattern formed at block 504. In one example, for patterning Electron Beam Lithography (EBL) using polymethylmethacrylate (PMMA) as an electron sensitive resist. The heating assembly can be formed at block 506 using Direct Current Sputtering (DC-sputtering) of metal followed by lift-off to remove the resist.

At block 508, a thermally conductive layer is deposited on a portion of the heating strip. In one example, the thermally conductive layer may be the first thermally conductive layer 314a and the second thermally conductive layer 314b as described with reference to FIG. 3. In one example, the thermally conductive layer is silicon dioxide which is deposited over the portion of the heating strip by Electron Beam Evaporation (e-beam evaporation) as known in the art. However, as will be understood, other techniques may be used.

At block 510, a sensing electrode assembly can be patterned. In an example, the sensing electrode assembly is patterned over the sacrificial layer and the thermally conductive layer. In an example, the sensing electrode assembly may comprise the common electrode strip 302, the first electrode strip 304, and the second electrode assembly along with their respective contact pads 310a, 310b, and 312 as described with reference to FIG. 3. In one example, the sensing electrode assembly can be patterned using Electron Beam Lithography (EBL) using polymethylmethacrylate (PMMA) as an electron sensitive resist.

At block 512, the sensing electrode assembly may be formed based on the pattern as formed at block 510. In an example, the sensing electrode assembly can be formed by DC-sputtering of the metal, for example, platinum or titanium and the like.

At block 514, a first sensing member may be deposited and disposed between the first electrode strip and the common electrode strip. The first sensing member may be the first sensing member 312a as described with reference to FIG. 3. In one example, this can be deposited using Radio Frequency sputtering. However other deposition techniques, such as Direct Current sputtering, solution dispensing can also be used.

At block 516, a second sensing member may be deposited and disposed between the second electrode strip and the common electrode strip. The second sensing member may be the second sensing member 312b as described with reference to FIG. 3 In one example, this can be deposited using Radio Frequency sputtering. However other deposition techniques, such as Direct Current sputtering, solution dispensing can also be used.

In one example, the method 500 can further comprise creating an air pocket in the sacrificial layer below the portion of the heating strip in contact with the thermally conductive layer. In one example, the air pocket created may be first air pocket 322a and second air pocket 322b as described with reference to FIG. 3. The air pocket may be created by etching and lithography techniques known in the art. In an example, the method 500 can use reactive ion etching (RIE) for surface micro-machining.

The present subject matter will now be illustrated with working examples, which are intended to illustrate the working of disclosure and not intended to be taken restrictively to imply any limitations on the scope of the present disclosure. Unless defined otherwise, all technical and scientific terms used herein have the same meaning as commonly understood to one of ordinary skill in the art to which this disclosure belongs. It is to be understood that this disclosure is not limited to the particular methods and experimental conditions described, as such methods and conditions may vary depending on the process and inputs used as will be easily understood by a person skilled in the art.

EXAMPLES

Example 1: Temperature V Power Study

Figure 6:
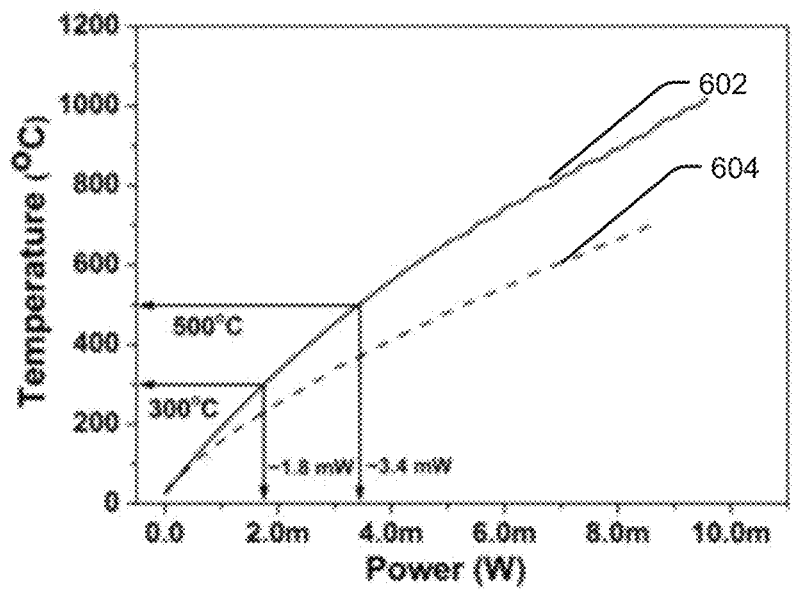
FIG. 6 illustrates a graph depicting temperature versus power relation of a heating assembly of the nano-sensor, in accordance with an implementation of the present disclosure.

In this example, study was conducted to observe the relationship between temperature of the heating assembly and power consumed by a nano-sensor. FIG. 6 illustrates the temperature and power relationship, in accordance with an implementation of the present subject matter. Line 602 depicts temperature variation of a nano-sensor where the air pocket is not created below the heating assembly while line 604 depicts temperature variation of a nano-sensor where the air pocket is provided below the heating assembly. It was observed that the nano-sensor where the air pocket provided below the heating assembly had lesser power consumption compared to the nano-sensor without air pocket provided below the heating assembly.

Example 2: Temperature V Power Study

Figure 7:
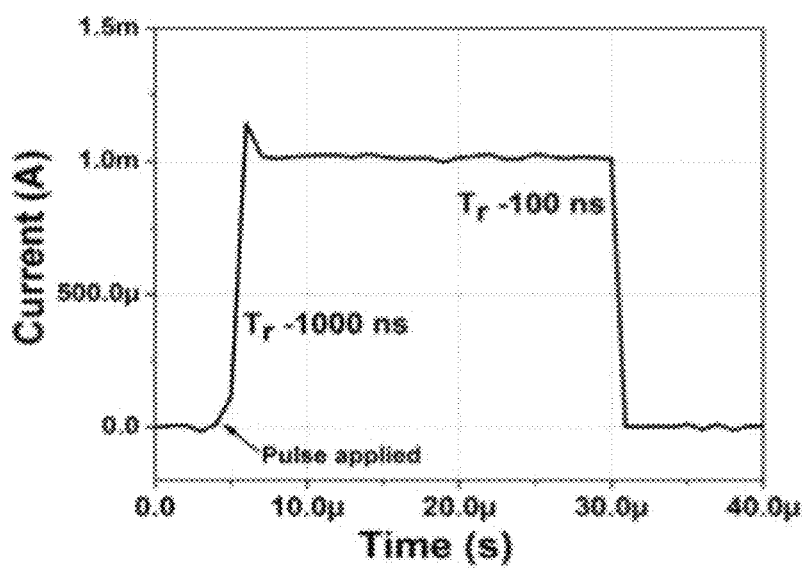
FIG. 7 illustrates a graph depicting thermal time constant of the heating assembly, in accordance with an implementation of the present disclosure.
Figure 8A:
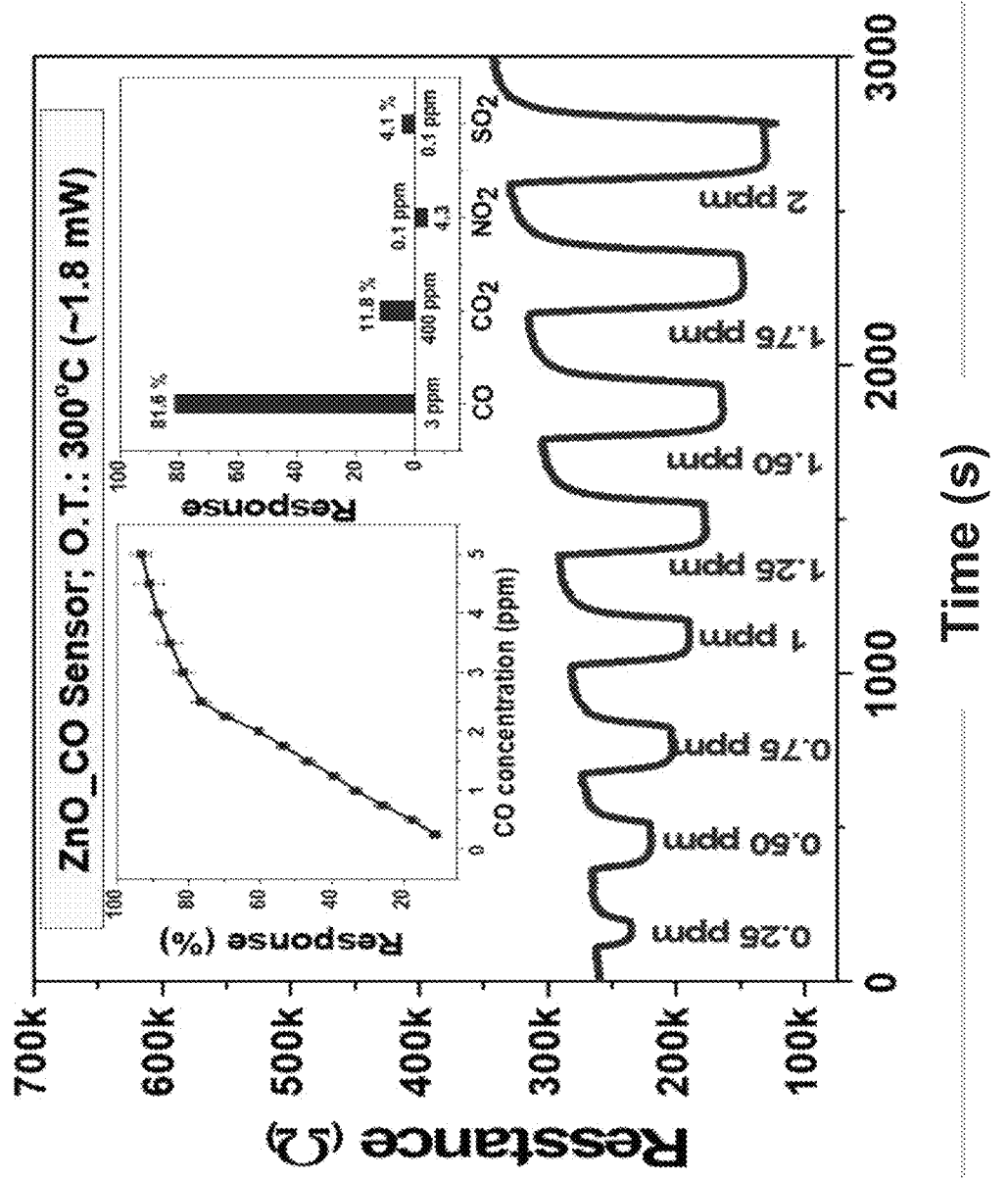
FIG. 8($a$)-($d$) illustrate graphs depicting results of (a) carbon monoxide, (b) carbon dioxide, (c) nitrogen dioxide, and (d) sulfur dioxide sensing signals by each of four nano-sensors of the nano-sensor array, in accordance with an implementation of the present disclosure.
Figure 8B:
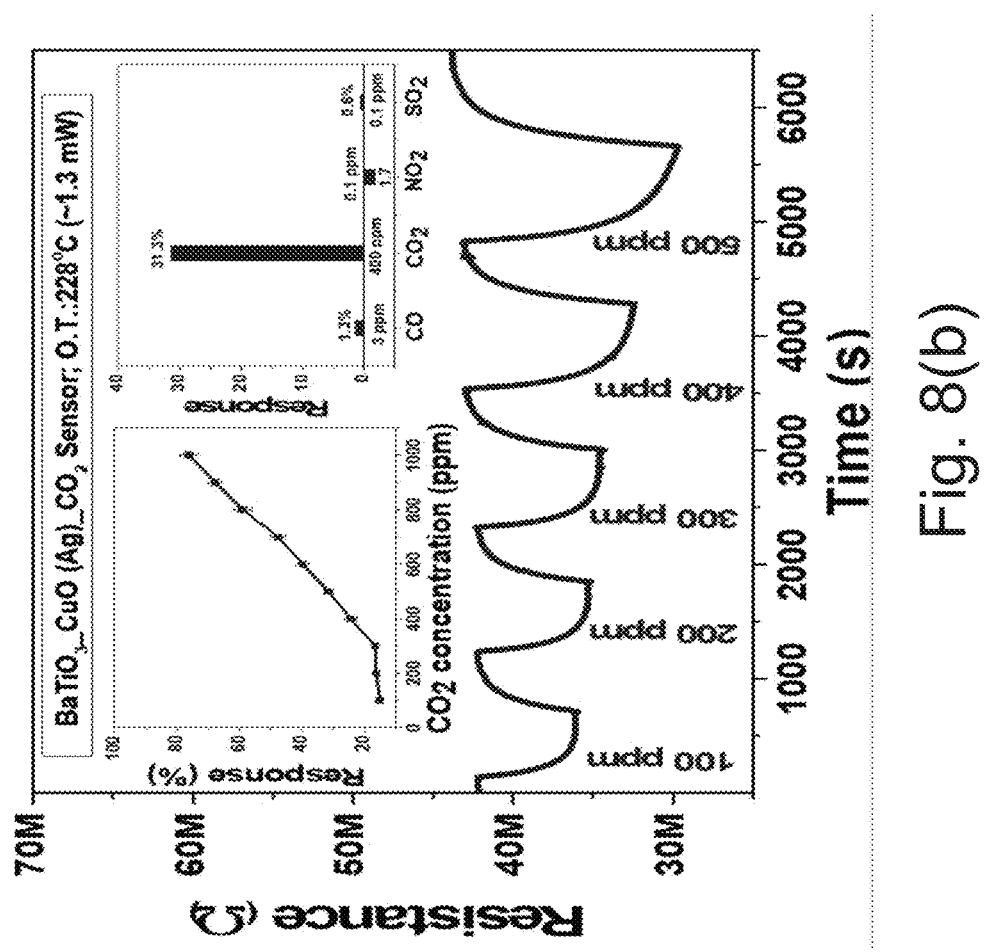
Figure 8C:
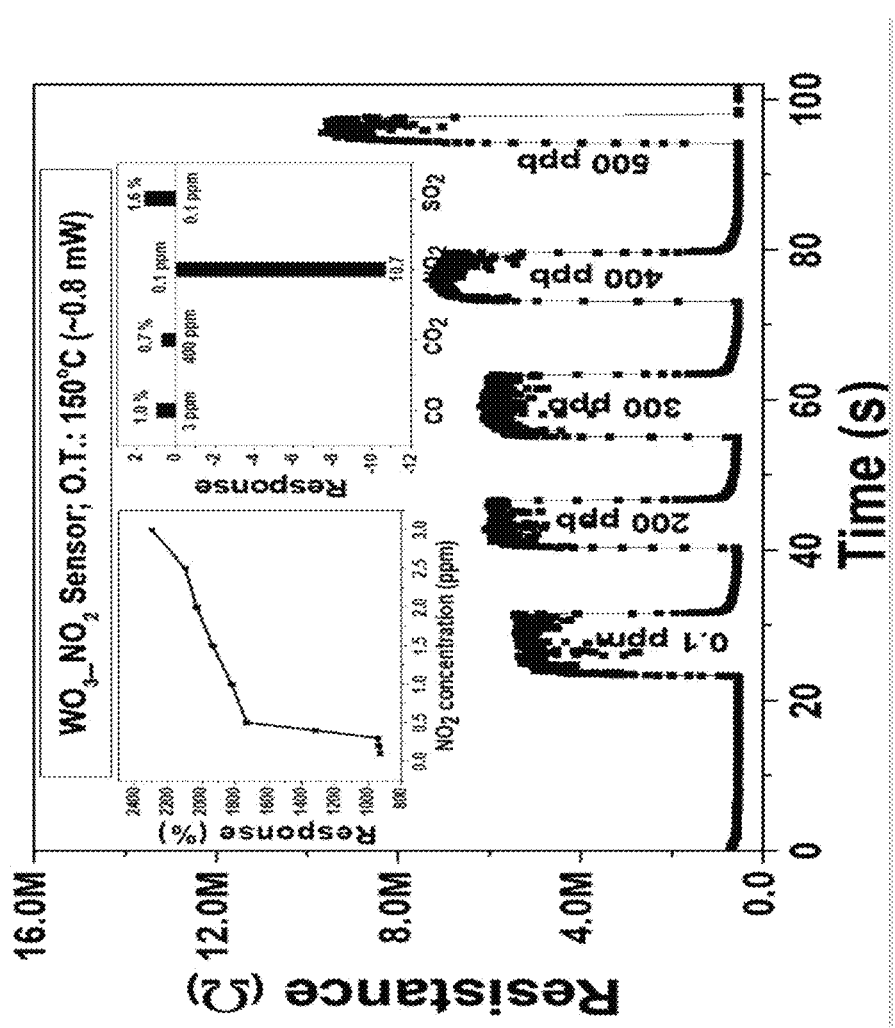
Figure 8D:
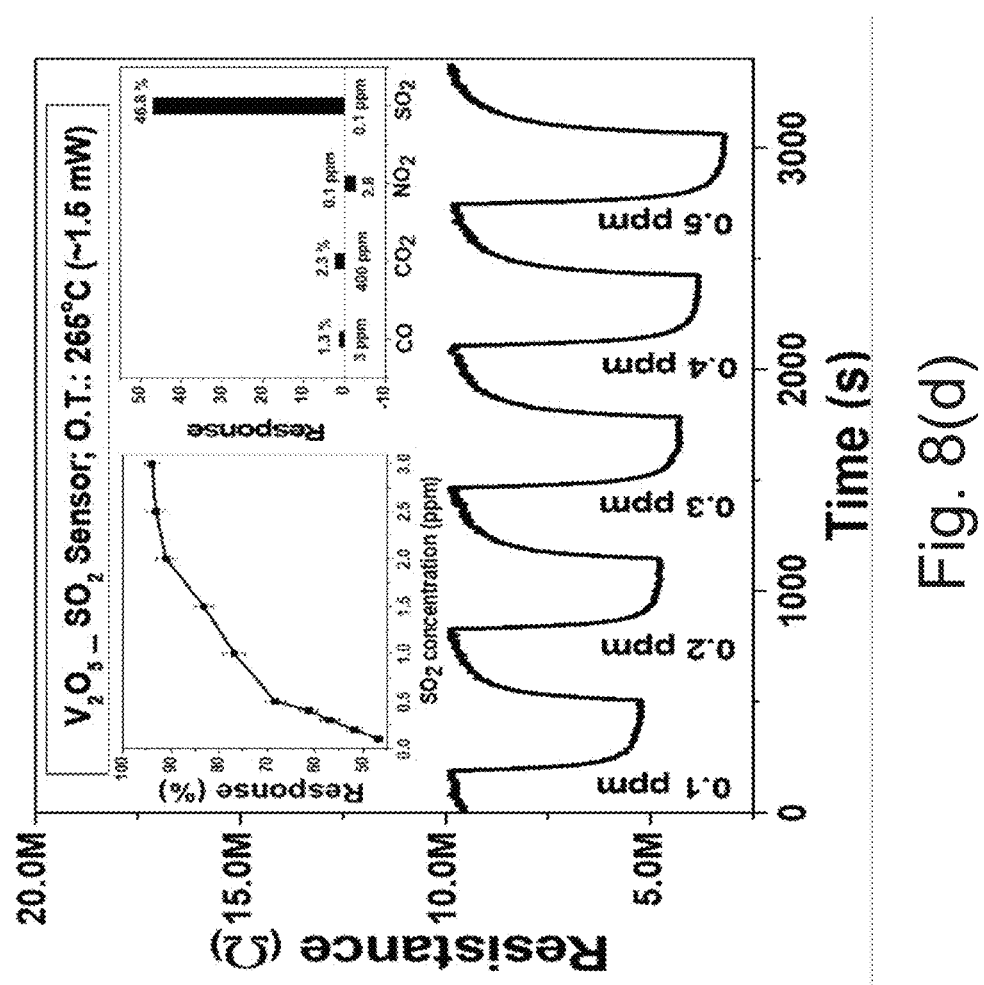

In this example, reaction time of the nano-sensor was studied. FIG. 7 illustrates a graph depicting thermal time constant of the nano-sensor having the air pocket provided below the heating assembly. It was observed from the graph as illustrated in FIG. 7 that the thermal time constant of the nano-sensor is close to $2\mu$ second. This thermal time constant implies that the nano-sensor can be operated at short pulses.

Example 3: Multiplexed Study Using a Nano-Sensor Array

To conduct multiplexed detection of gaseous components, a nano-sensor array comprising four sensing members, each sensing member specific to a gaseous component to be detected. The nano-sensor array was mounted in a gas calibration chamber. The gas calibration chamber had the provision to connect target gases cylinders ($CO$, $CO_2$, $NO_2$ and $SO_2$) and synthetic air (80% nitrogen and 20% oxygen) cylinders to set the appropriate concentration of gases to flow inside the gas calibration chamber during sensing measurements. Two mass flow controllers (MFCs) were used to set the gas flows for synthetic air and target gas with a static gas mixer to uniformly mix the target gas with synthetic air before introducing in gas chamber.

Total gas flow rate was fixed to 500 sccm for each concentration. The real-time monitoring of sensor's signal was recorded using the Matlab R2010a program, where the data acquisition every second. The nano-sensor array was wire bonded to a printed circuit board (PCB) to facilitate the gas sensing measurement. The response time was calculated by using the time taken by the sensor to span 10% to 90% of the steady state resistance, when the target gas was introduced. Response of nano-sensor array has been defined as the ratio of change in film resistance upon exposure to test gas ($R_g$) to the film resistance in air ($R_a$) at same operating temperature and is calculated by equation 1 provided below. As will be understood, film resistance refers to resistance provided by the sensing member.

$$\text{Response} = [(R_a - R_g)/R_a] \times 100\% \qquad \text{Equation 1}$$

The nano-sensor array has been extensively characterized by operating individual sensor separately and it is shown to have very good sensitivity and selectivity.

For selectivity measurement, each gas analyte was introduced one by one using the above MFCs configuration into the gas chamber where the sensor array was mounted. All the sensors were active during the selectivity measurement. The recorded data summaries that the sensor is highly selective towards to particular gas analytes.

FIGS. 8 (a) (b) (c) (d) illustrate graphs depicting sensing results of CO, CO2, NO2 and SO2 sensing by nano-sensor array, in accordance with an implementation of the present disclosure. The sensing results are provided for all the resistance change of the four sensing members. To obtain FIG. 8(a) ZnO sensing element was used for sensing CO gas at temperature of 300° C. and power of 1.8 mW. To obtain FIG. 8(b) $BaTiO_3$_CuO (1% Ag) sensing element was used for sensing $CO_2$ gas at temperature of 228° C. and power of 1.3 mW. To obtain FIG. 8(c) $WO_3$ sensing element was used for sensing $NO_2$ at temperature of 150° C. and power of 0.8 mW. To obtain FIG. 8(d) $V_2O_5$ sensing element was used for sensing $SO_2$ at temperature of 265° C. and power of 1.5 mW.

It was observed that the choice of these sensing elements of nano-sensor array exhibits fairly good cross-sensitivity performance in presence of other interfering gases and is capable of analyzing the composition of gas mixtures. The sensor disclosed in the present disclosure also has the advantage of its capability to operate in high temperature environment but with ultra-low power consumption.

Although the subject matter has been described in considerable detail with reference to certain examples and implementations thereof, other implementations are possible. As such, the scope of the present subject matter should not be limited to the description of the preferred examples and implementations contained therein.

We claim:

1. A nano-sensor comprising:
a pair of sensing electrode assemblies aligned longitudinally along a first axis, each sensing electrode assembly comprising:
a contact pad; and
an electrode strip coupled to the contact pad at a first end of the electrode strip and aligned longitudinally along the first axis,
wherein a gap is provided between second ends of electrode strips in the pair of sensing electrode assemblies;
a sensing member aligned longitudinally along the first axis and disposed between the pair of sensing electrode assemblies across the gap in the pair of sensing electrode assemblies, wherein the sensing member is in contact with a top portion of the second ends of the electrode strips in the pair of sensing electrode assemblies, wherein the sensing member is to detect, at a predetermined temperature, presence of a gaseous component in an ambient gas;
a thermally conductive layer in contact with the sensing member; and
a heating assembly comprising a pair of heating contact pads and a heating strip disposed between and coupled to the pair of heating contact pads, wherein the heating assembly is aligned longitudinally along a second axis substantially perpendicular to the first axis, and wherein a portion of the heating strip is in contact with the thermally conductive layer to heat the sensing member to the predetermined temperature through the thermally conductive layer.

2. The nano-sensor as claimed in claim 1 comprising an air pocket provided below the portion of the heating strip in contact with the thermally conductive layer.

3. The nano-sensor as claimed in claim 1, wherein the sensing member is selected from the group consisting of zinc oxide, barium titanium oxide copper oxide with silver doping, tungsten oxide, and vanadium oxide, wherein the sensing member has a thickness in a range of 10 nm to 200 nm.

4. The nano-sensor as claimed in claim 1, wherein the thermally conductive layer is fabricated from a semiconductor selected from the group consisting of silicon oxide and silicon nitride, wherein the thermally conductive layer has a thickness in a range of 10 nm to 200 nm.

5. The nano-sensor as claimed in claim 1, wherein the heating assembly is fabricated from a metal selected from the group consisting of platinum, titanium and titanium nitride, wherein a thickness of the heating strip is 10 nm to 100 nm.

6. The nano-sensor as claimed in claim 1, wherein the gap between the second ends of the electrode strips of the pair of electrode assemblies is about 150-250 nm.

7. A nano-sensor array comprising:
a sensing electrode assembly comprising:
a common electrode strip having an intermediate portion between two opposing ends of the common electrode strip;
a first electrode strip;
a second electrode strip, wherein the first electrode strip, the second electrode strip, and the common electrode strip are aligned longitudinally along a first axis, wherein the common electrode strip is provided between the first electrode strip and the second electrode strip, and wherein a first gap is provided between the common electrode strip and the first electrode strip and a second gap is provided between the common electrode strip and the second electrode strip; and
a respective contact pad at a first end of the first electrode strip and the second electrode strip;
a first sensing member aligned longitudinally along the first axis and disposed between the first electrode strip and the common electrode strip across the first gap, wherein the first sensing member is in contact with a top portion of a second end of the first electrode strip and the common electrode strip, wherein the first sensing member is to detect, at a first predetermined temperature, presence of a first gaseous component in an ambient gas;
a second sensing member aligned longitudinally along the first axis and disposed between the second electrode strip and the common electrode strip across the second gap, wherein the second sensing member is in contact with a top portion of a second end of the second electrode strip and the common electrode strip, wherein the second sensing member is to detect, at a second predetermined temperature, presence of a second gaseous component in an ambient gas;
a respective thermally conductive layer in contact with each one of the first sensing member and the second sensing member; and
a heating assembly comprising a first heating assembly in contact with the first thermally conductive layer and a second heating assembly in contact with the second thermally conductive layer, each of the first heating assembly and the second heating assembly comprising a pair of heating contact pads and a heating strip disposed between and coupled to the pair of heating contact pads, wherein the heating strip is aligned longitudinally along a second axis substantially perpendicular to the first axis, and wherein a portion of the heating strip is in contact with the respective thermally conductive layer to heat the respective sensing member to the respective predetermined temperature through the respective thermally conductive layer.

8. The nano-sensor array as claimed in claim 7, wherein one each of the pair of heating contact pads is common for the first heating assembly and the second heating assembly.

9. A method to fabricate a nano-sensor comprising:
depositing a sacrificial layer over a substrate;
patterning a heating assembly on the sacrificial layer;
forming the heating assembly, wherein the heating assembly comprises a pair of heating contact pads and a heating strip disposed between and coupled to the pair of heating contact pads, wherein the heating assembly is aligned longitudinally along a second axis;
depositing a thermally conductive layer on a portion of the heating strip;
patterning a pair of sensing electrode assemblies;
forming the pair of sensing electrode assemblies aligned longitudinally along a first axis substantially perpendicular to the second axis, each sensing electrode assembly comprising:
a contact pad; and
an electrode strip coupled to the contact pad at a first end of the electrode strip and aligned longitudinally along the first axis,
wherein a gap is provided between second ends of electrode strips in the pair of sensing electrode assemblies; and
depositing a sensing member aligned longitudinally along the first axis and disposed between the pair of sensing electrode assemblies across the gap in the pair of sensing electrode assemblies, wherein the sensing member is in contact with a top portion of the second ends of the electrode strips in the pair of sensing electrode assemblies, wherein the sensing member is to detect, at a predetermined temperature, presence of a gaseous component in an ambient gas.

10. The method as claimed in claim 9, wherein the method comprises creating an air pocket in the sacrificial layer below the portion of the heating strip in contact with the thermally conductive layer.

11. The method as claimed in claim 9, wherein:
the substrate is fabricated from a semiconductor selected from the group consisting of silicon, ceramics, plastic, and polyimide, wherein the substrate has a thickness in a range of 50 µm to 500 µm; and
the sacrificial layer is fabricated from a semiconductor selected from the group consisting of silicon oxide and silicon nitride, wherein the sacrificial layer has a thickness in a range of 10 nm to 200 nm.

12. A method for fabricating an array of nano-sensors comprising:
depositing a sacrificial layer over a substrate;
patterning a heating assembly on the sacrificial layer;
forming the heating assembly wherein the heating assembly comprises:
a first heating assembly and a second heating assembly, each of the first heating assembly and the second heating assembly comprising a pair of heating contact pads and a heating strip disposed between and coupled to the pair of heating contact pads, wherein the heating strip is aligned longitudinally along a second axis;
depositing a respective thermally conductive layer on a portion of the heating strip of the first heating assembly and the second heating assembly;
patterning a sensing electrode assembly comprising:
a common electrode strip having an intermediate portion between two opposing ends of the common electrode strip;
a first electrode strip;
a second electrode strip, wherein the first electrode strip, the second electrode strip, and the common electrode strip are aligned longitudinally along a first axis substantially perpendicular to the second axis, wherein the common electrode strip is provided between the first electrode strip and the second electrode strip, and wherein a first gap is provided between the common electrode strip and the first electrode strip and a second gap is provided between the common electrode strip and the second electrode strip; and
a respective contact pad at a first end of the first electrode strip and the second electrode strip;
forming the sensing electrode assembly;
depositing a first sensing member aligned longitudinally along the first axis and disposed between the first electrode strip and the common electrode strip across the first gap, wherein first sensing member is in contact with a top portion of a second end of the first electrode strip and the common electrode strip, wherein the first sensing member is to detect, at a first predetermined temperature, presence of a first gaseous component in an ambient gas; and
depositing a second sensing member aligned longitudinally along the first axis and disposed between the second electrode strip and the common electrode strip across the second gap, wherein the second sensing member is in contact with a top portion of a second end of the second electrode strip and the common electrode strip, wherein the second sensing member is to detect, at a second predetermined temperature, presence of a second gaseous component in an ambient gas.

13. The method as claimed in claim 12, wherein the method comprises creating an air pocket below the portion of each heating strip in contact with the first thermally conductive layer and the second thermally conductive layer.

* * * * *